United States Patent
Liu et al.

(10) Patent No.: US 7,430,148 B2
(45) Date of Patent: Sep. 30, 2008

(54) VOLATILE MEMORY ELEMENTS WITH BOOSTED OUTPUT VOLTAGES FOR PROGRAMMABLE LOGIC DEVICE INTEGRATED CIRCUITS

(75) Inventors: Lin-Shih Liu, Fremont, CA (US); Mark T. Chan, San Jose, CA (US)

(73) Assignee: Altera Corporation, San Jose, CA (US)

( * ) Notice: Subject to any disclaimer, the term of this patent is extended or adjusted under 35 U.S.C. 154(b) by 352 days.

(21) Appl. No.: 11/282,858

(22) Filed: Nov. 17, 2005

(65) Prior Publication Data

US 2007/0113106 A1      May 17, 2007

(51) Int. Cl.
*G11C 5/14* (2006.01)
(52) U.S. Cl. .................. 365/226; 365/227; 365/228; 365/229
(58) Field of Classification Search ............. 365/226, 365/227, 228, 229
See application file for complete search history.

(56) References Cited

U.S. PATENT DOCUMENTS

| | | | |
|---|---|---|---|
| 5,025,417 A * | 6/1991 | Miyamoto et al. ..... | 365/185.23 |
| 5,122,846 A | 6/1992 | Haken | |
| 5,214,327 A | 5/1993 | Saeki et al. | |
| 5,432,467 A * | 7/1995 | Reddy ................ | 326/81 |
| 5,642,315 A | 6/1997 | Yamaguchi | |
| 5,757,702 A | 5/1998 | Iwata et al. | |
| 5,801,551 A | 9/1998 | Lin | |
| 5,920,201 A | 7/1999 | Mehrotra et al. | |
| 6,025,737 A | 2/2000 | Patel et al. | |
| 6,114,843 A | 9/2000 | Olah | |
| 6,232,893 B1 | 5/2001 | Cliff et al. | |
| 6,433,585 B1 | 8/2002 | Patel et al. | |
| 6,724,222 B2 | 2/2003 | Patel et al. | |
| 6,795,332 B2 | 9/2004 | Yamaoka et al. | |
| 6,897,679 B2 | 5/2005 | Cliff et al. | |
| 6,995,584 B1 * | 2/2006 | Nguyen et al. ........... | 326/58 |
| 7,277,351 B2 * | 10/2007 | Liu et al. ................ | 365/226 |
| 2004/0093529 A1 | 5/2004 | Devlin et al. | |
| 2007/0109017 A1 * | 5/2007 | Liu et al. ................ | 326/41 |
| 2007/0113106 A1 | 5/2007 | Liu et al. | |

* cited by examiner

*Primary Examiner*—Pho M. Luu
(74) *Attorney, Agent, or Firm*—Treyz Law Group; G. Victor Treyz

(57) ABSTRACT

Integrated circuits are provided that have memory elements. The memory elements produce output signals. The integrated circuits may be programmable logic device integrated circuits containing programmable logic including transistors with gates. When loaded with configuration data, the memory elements produce output signals that are applied to the gates of the transistors in the programmable logic device to customize the programmable logic. To ensure that the transistors in the programmable logic are turned on properly, the memory elements are powered with an elevated power supply level during normal device operation. During data loading operations, the power supply level for the memory elements is reduced. Reducing the memory element power supply level during loading increases the write margin for the memory elements.

39 Claims, 11 Drawing Sheets

VOLATILE MEMORY ELEMENTS WITH BOOSTED OUTPUT VOLTAGES FOR PROGRAMMABLE LOGIC DEVICE INTEGRATED CIRCUITS

BACKGROUND

This invention relates to volatile memory elements, and more particularly, to volatile memory elements that have elevated output voltages for integrated circuits such as programmable logic devices.

Integrated circuits often contain volatile memory elements. Typical volatile memory elements are based on cross-coupled inverters (latches) and are used to store data. Each memory element can store a single bit of data.

Volatile memory elements are often used to store configuration data in programmable logic devices. Programmable logic devices are a type of integrated circuit that can be customized in relatively small batches to implement a desired logic design. In a typical scenario, a programmable logic device manufacturer designs and manufactures uncustomized programmable logic device integrated circuits in advance. Later, a logic designer uses a logic design system to design a custom logic circuit. The logic design system uses information on the hardware capabilities of the manufacturer's programmable logic devices to help the designer implement the logic circuit using the resources available on a given programmable logic device.

The logic design system creates configuration data based on the logic designer's custom design. When the configuration data is loaded into the memory elements of one of the programmable logic devices, it programs the logic of that programmable logic device so that the programmable logic device implements the designer's logic circuit. The use of programmable logic devices can drastically reduce the amount of effort required to implement a desired integrated circuit design.

Conventional programmable logic device memory elements are powered at a positive power supply voltage. The positive power supply voltage that is used to power conventional programmable logic device memory elements is typically referred to as Vcc or Vcc-core and is the same power supply voltage used to power the core logic in the programmable logic device.

Integrated circuits such as programmable logic device integrated circuits that operate at low values of Vcc offer benefits over integrated circuits that operate at higher values of Vcc. For example, reductions in Vcc generally lead to reduced power consumption. Because of these benefits, the semiconductor industry is continually striving to produce processes and circuit designs that support reductions in Vcc. Previous generations of programmable logic devices operated at Vcc levels of 2.0 volts, 1.8 volts, and 1.5 volts. More recently, Vcc levels of 1.2 volts have been used in programmable logic devices. It is expected that future programmable logic devices will support Vcc levels of less than 1.2 volts (e.g., 1.1 volts or 1.0 volts).

The memory elements in a programmable logic device produce static output signals that reflect the configuration data that has been loaded into the memory elements. The static output signals drive the gates of metal-oxide-semiconductor (MOS) transistors. Some of the transistors are used as pass transistors in multiplexers and other logic components. The pass transistors in a programmable logic device will only operate properly if they are driven at a large enough voltage. If the pass transistors in a programmable logic device are driven at an insufficient voltage level because, for example, the Vcc level on the device is too low, the data signals passing through the pass transistors will suffer excessive voltage loss and may no longer be recognizable as valid logic signals on the device.

It would therefore be desirable to be able to provide programmable logic device integrated circuits that operate well at low power supply levels.

SUMMARY

In accordance with the present invention, integrated circuits such as programmable logic device integrated circuits are provided that contain memory elements. A programmable logic device integrated circuit contains programmable logic. The programmable logic is programmed by loading appropriate configuration data into the memory elements. When loaded, the memory elements produce static output signals corresponding to the loaded configuration data. The static output signals are applied to the gates of transistors in the programmable logic to turn the transistors on and off as appropriate.

To ensure that the static output signals are strong enough to properly control the programmable logic transistors, the memory elements are powered with an elevated power supply voltage. Memory elements that contain logic zero bits produce low static output signals. Memory elements that contain logic one bits produce high static output signals. The high static output signals have voltages equal to the elevated power supply voltage.

The memory elements are loaded with configuration data using data lines. Address lines and address transistors are used to control which memory elements are loaded. The power supply voltage that is used to power the memory elements is reduced during data loading operations. This increases the write margin for the memory elements while relaxing requirements for the address transistors.

Further features of the invention, its nature and various advantages will be more apparent from the accompanying drawings and the following detailed description of the preferred embodiments.

DETAILED DESCRIPTION

The present invention relates to integrated circuits that contain memory elements. The invention also relates to memory elements and circuits for loading data into the memory elements. The integrated circuits may be memory chips, digital signal processing circuits with memory arrays, microprocessors, application specific integrated circuits with memory arrays, programmable logic device integrated circuits in which memory elements are used for configuration memory, or any other suitable integrated circuit. For clarity, the present invention will generally be described in the context of programmable logic device integrated circuits and programmable logic device memory elements.

Figure 1:
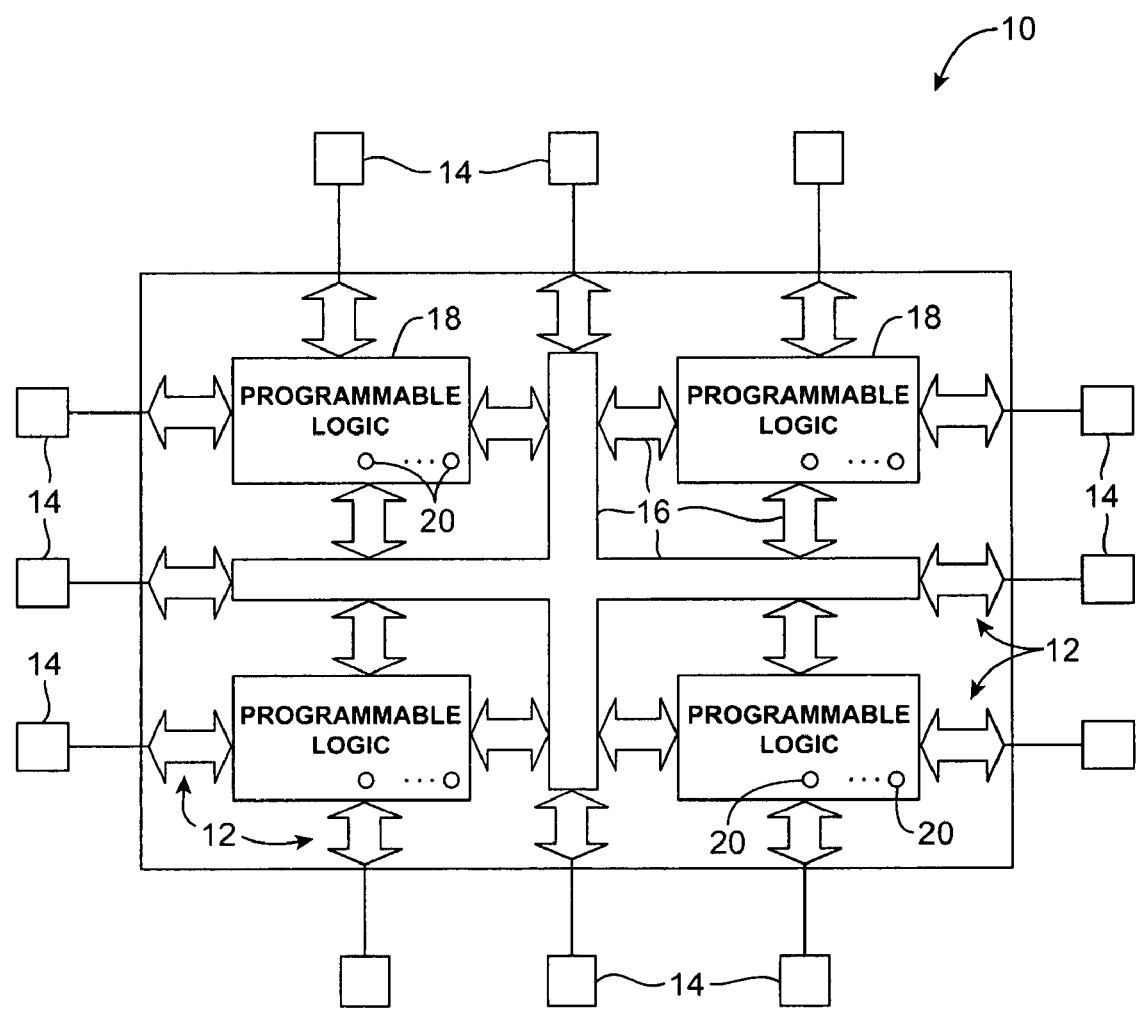
FIG. 1 is a diagram of an illustrative programmable logic device integrated circuit in accordance with the present invention.

An illustrative programmable logic device 10 in accordance with the present invention is shown in FIG. 1.

Programmable logic device 10 may have input/output circuitry 12 for driving signals off of device 10 and for receiving signals from other devices via input/output pins 14. Interconnection resources 16 such as global and local vertical and horizontal conductive lines and busses may be used to route signals on device 10. Interconnection resources 16 include fixed interconnects (conductive lines) and programmable interconnects (i.e., programmable connections between respective fixed interconnects). Programmable logic 18 may include combinational and sequential logic circuitry. The programmable logic 18 may be configured to perform a custom logic function. The programmable interconnects associated with interconnection resources may be considered to be a part of programmable logic 18.

Programmable logic device 10 contains volatile memory elements 20 that can be loaded with configuration data (also called programming data) using pins 14 and input/output circuitry 12. Once loaded, the memory elements each provide a corresponding static control output signal that controls the state of an associated logic component in programmable logic 18. Typically the memory element output signals are used to control the gates of metal-oxide-semiconductor (MOS) transistors. Most of these transistors are generally n-channel metal-oxide-semiconductor (NMOS) pass transistors in programmable components such as multiplexers. When a memory element output is high, the pass transistor controlled by that memory element is turned on and passes logic signals from its input to its output. When the memory element output is low, the pass transistor is turned off and does not pass logic signals.

A typical memory element 20 is formed from a number of transistors configured to form cross-coupled inverters. With one suitable approach, complementary metal-oxide-semiconductor (CMOS) integrated circuit technology is used to form the memory elements 20, so CMOS-based memory element implementations are described herein as an example. In the context of programmable logic device integrated circuits, the memory elements store configuration data and are therefore sometimes referred to as configuration random-access memory (CRAM) cells.

The memory elements may be loaded from an external erasable-programmable read-only memory and control chip via pins 14 and input/output circuitry 12. The loaded memory elements 20 provide static control signals that are applied to the terminals (e.g., gates) of circuit elements (e.g., metal-oxide-semiconductor transistors) in programmable logic 18 to control those elements (e.g., to turn certain transistors on or off) and thereby configure the logic in programmable logic 18. The circuit elements may be transistors such as pass transistors, parts of multiplexers, look-up tables, logic arrays, AND, OR, NAND, and NOR logic gates, etc.

The memory elements 20 are generally arranged in an array pattern. In a typical modern programmable logic device, there may be millions of memory elements 20 on each chip. During programming operations, the array of memory elements is provided with configuration data by a user (e.g., a logic designer). Once loaded with configuration data, the memory elements 20 selectively control (e.g., turn on and off) portions of the circuitry in the programmable logic 18 and thereby customize its functions so that it will operate as desired.

The circuitry of device 10 may be organized using any suitable architecture. As an example, the logic of programmable logic device 10 may be organized in a series of rows and columns of larger programmable logic regions each of which contains multiple smaller logic regions. The logic resources of device 10 may be interconnected by interconnection resources 16 such as associated vertical and horizontal conductors. These conductors may include global conductive lines that span substantially all of device 10, fractional lines such as half-lines or quarter lines that span part of device 10, staggered lines of a particular length (e.g., sufficient to interconnect several logic areas), smaller local lines, or any other suitable interconnection resource arrangement. If desired, the logic of device 10 may be arranged in more levels or layers in which multiple large regions are interconnected to form still larger portions of logic. Still other device arrangements may use logic that is not arranged in rows and columns.

Figure 2:
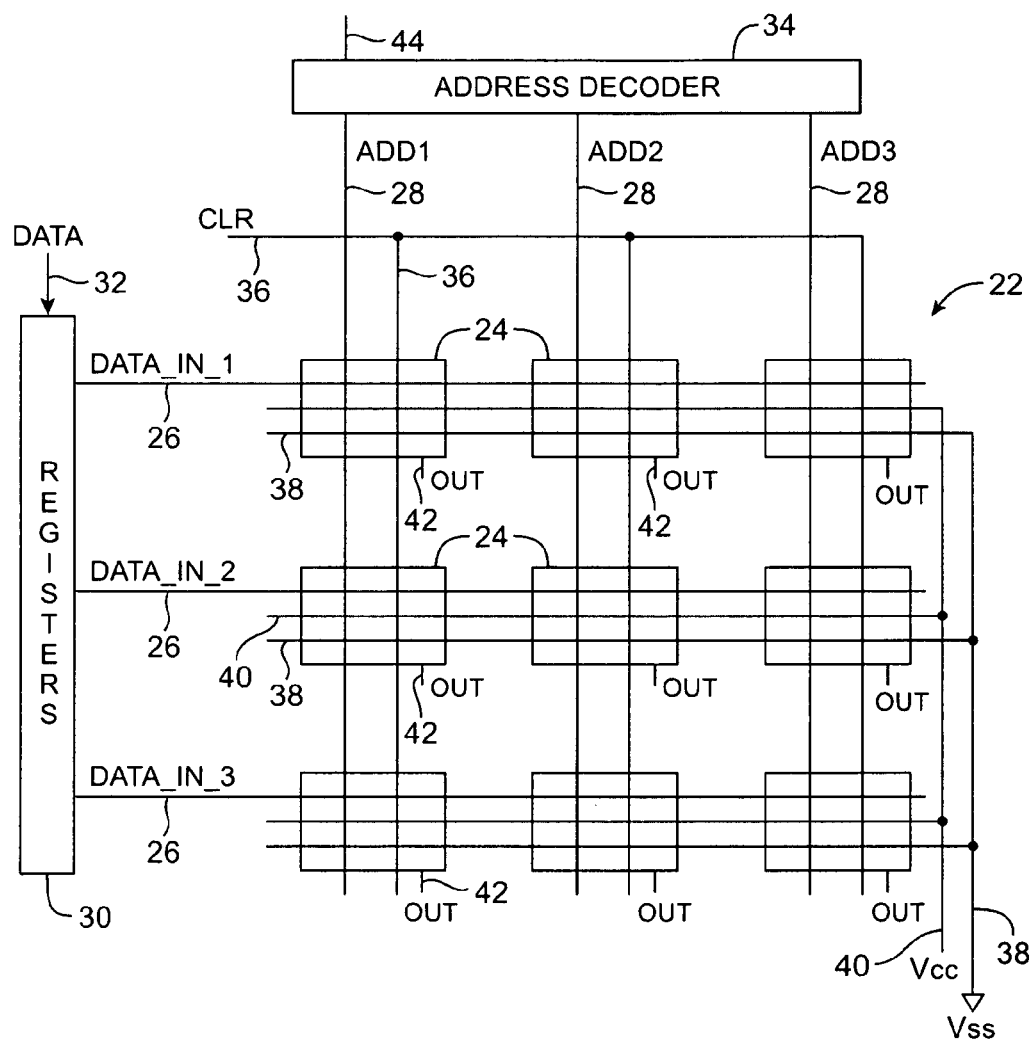
FIG. 2 is a diagram of a conventional array of programmable logic device memory elements.

When memory elements are arranged in an array, horizontal and vertical conductors and associated loading circuitry may be used to load the memory elements with configuration data. A conventional data loading arrangement is shown in FIG. 2. The arrangement of FIG. 2, has a 3×3 array 22 of memory elements 24. (Actual memory arrays typically have hundreds or thousands of rows and columns, but a 3×3 array is used as an example.) The array 22 receives power via positive power supply line 40 and ground line 38 (at 0 volts). The voltage Vcc on line 40 is typically 1.2 volts and the voltage Vss on ground line 38 is typically 0 volts.

A clear line 36 (labeled CLR) is used to clear the contents of the memory array 22. After the array has been cleared, configuration data may be loaded.

Configuration data is provided in series to registers 30 via input 32. The configuration data is then provided in parallel to array 22 via the DATA_IN_1, DATA_IN_2, and DATA_IN_3 lines 26. Address decoder 34 receives addressing information via input 44. In response, the address decoder asserts a desired one of the address lines 28 (i.e., ADD1, ADD2, or ADD3). When an address line is asserted in a given column, the data on the data lines 26 is loaded into the memory elements 24 in that column. The array is filled by systematically loading the memory elements in each of the columns of the array. After the array has been completely loaded with configuration data, the output 42 of each memory element 24 produces a corresponding static control signal for controlling the gate of a pass transistor or other logic component on the programmable logic device.

Figure 3:
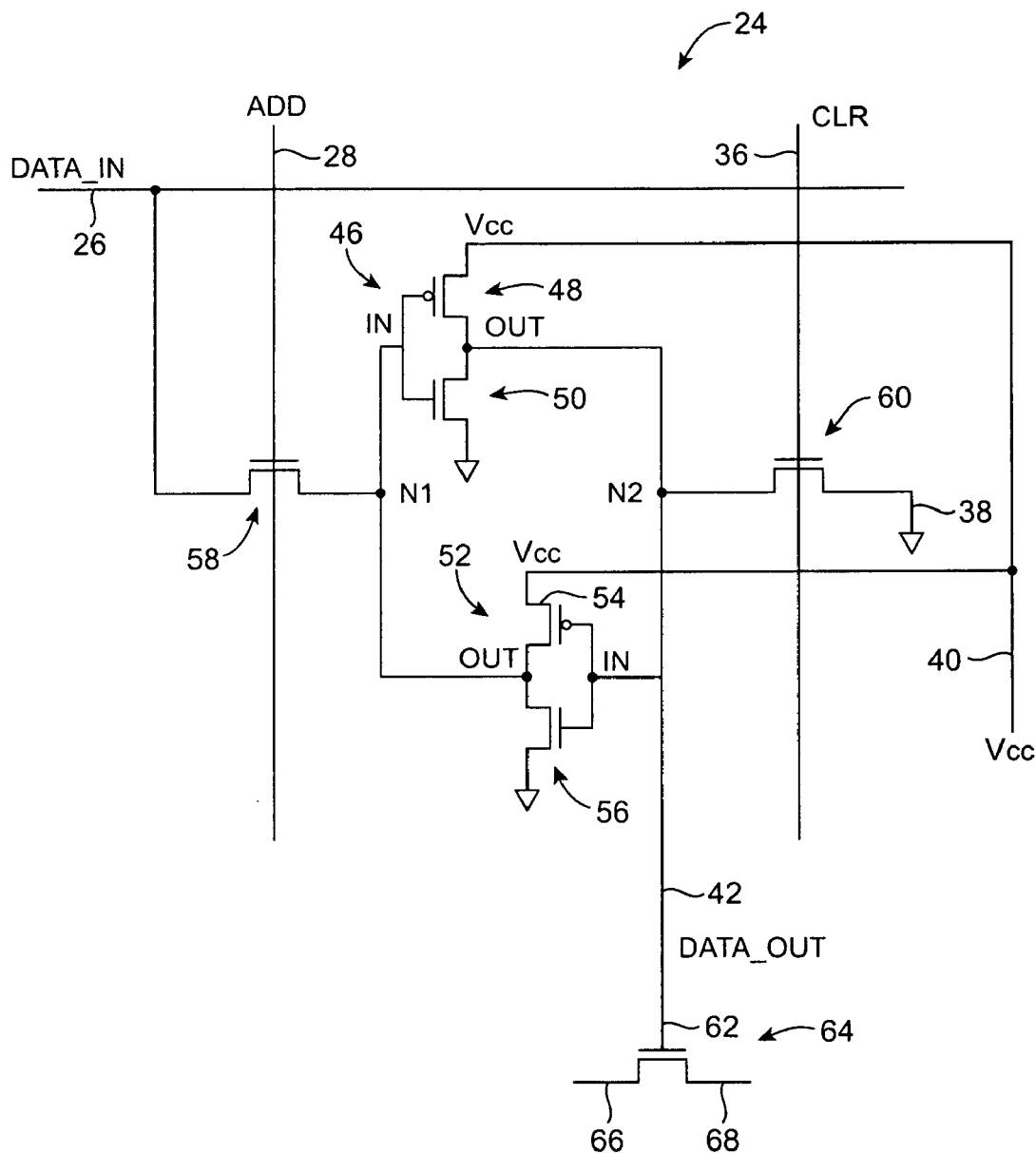
FIG. 3 is a diagram of a conventional programmable logic device memory element.

A conventional memory element 24 of the type used in array 22 of FIG. 2 is shown in FIG. 3. As shown in FIG. 3, the memory element 24 is formed from two cross-coupled inverters—inverter 46 and inverter 52. Inverter 46 has a p-channel metal-oxide-semiconductor (PMOS) transistor 48 and an n-channel metal-oxide-semiconductor (NMOS) transistor 50. Inverter 52 has PMOS transistor 54 and NMOS transistor 56. The NMOS transistor 60 is turned on during clear operations by activating clear line 36. This connects node N2 to ground 38 and clears the memory element 46. The output of the memory element on line 42 (DATA_OUT) is determined by the signal on node N2.

When address line 28 is taken high, NMOS transistor 58 is turned on and the signal on data line 26 is driven into the memory element 24. If the signal on line 26 is high, node N1 remains high and the memory element 24 remains in its low (cleared) state. The output DATA_OUT is low. If the signal on line 26 is low, node N1 is taken low and, due to the inversion of the low N1 signal by inverter 46, the voltage on node N2 is taken high. This makes the output DATA_OUT high.

The DATA_OUT signal is applied to the gate 62 of pass transistor 64. When DATA_OUT is low, pass transistor 64 is off. When DATA_OUT is high, pass transistor 64 is on and data is allowed to flow between line 66 and line 68.

Figure 4:
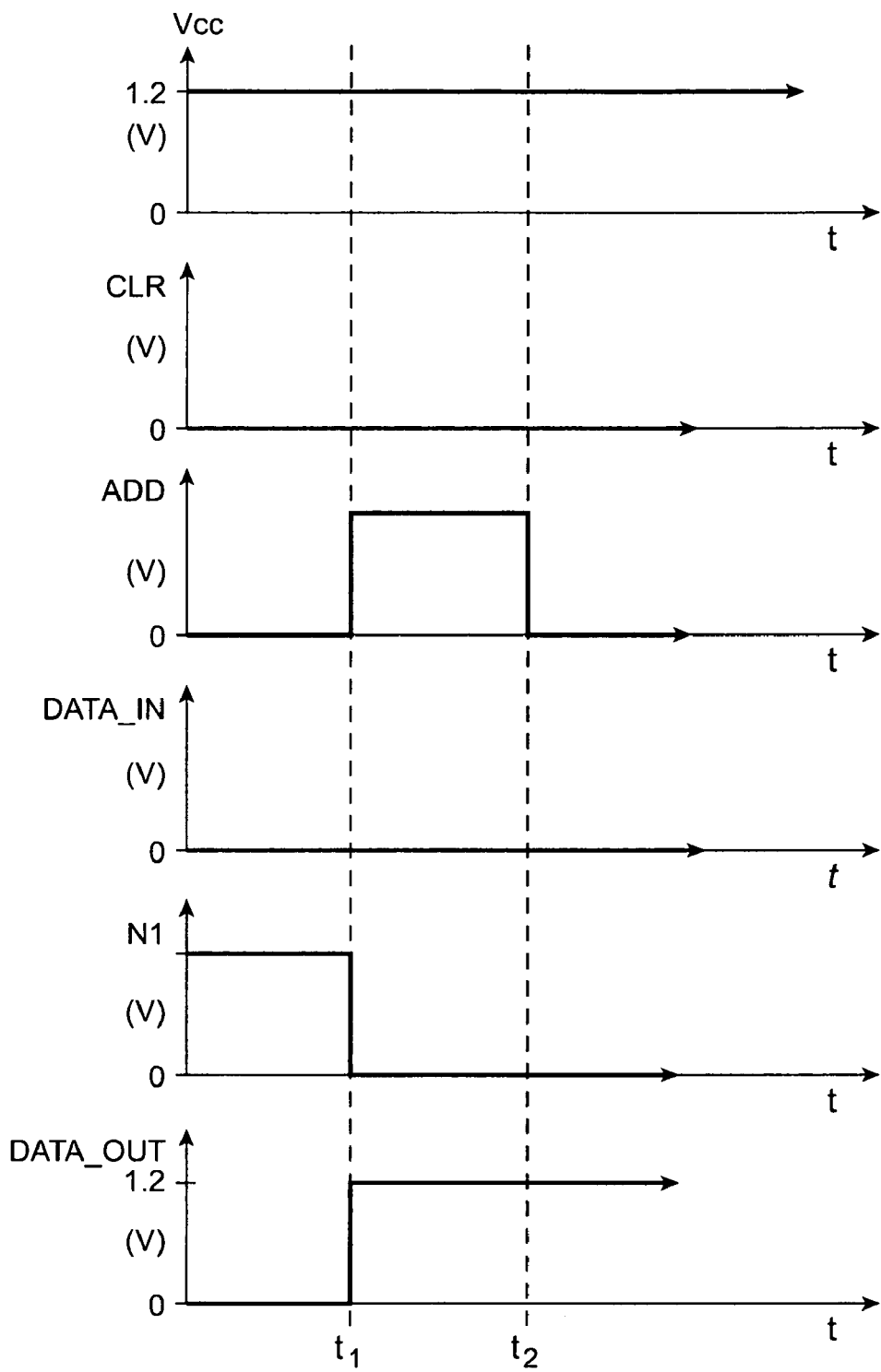
FIG. 4 is a timing diagram showing how a conventional programmable logic device memory cell is loaded with a configuration data bit having a logic one value.
Figure 5:
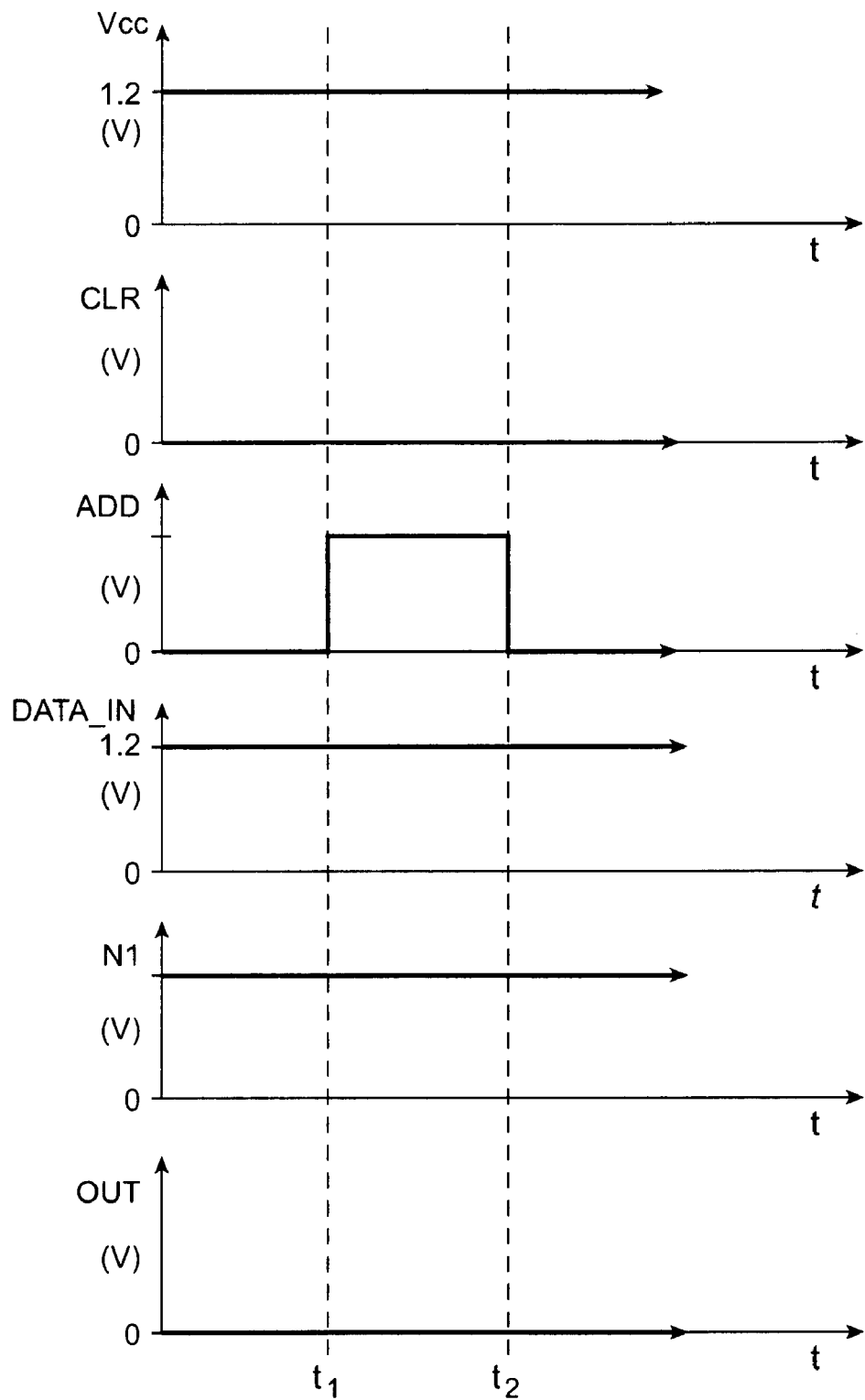
FIG. 5 is a timing diagram showing how a conventional programmable logic device memory cell is loaded with a configuration data bit having a logic zero value.

Signal timing diagrams showing operations associated with loading the conventional memory element 24 are shown in FIGS. 4 and 5. The traces of FIG. 4 illustrate the process of loading a logic "1" into a cleared memory element 24. The traces of FIG. 5 illustrate the process of loading a logic "0" into a cleared memory element 24.

The first trace of FIG. 4 shows that the voltage Vcc applied to Vcc line 40 is constant at 1.2 volts. This positive power supply voltage is applied to inverters 46 and 52.

The second trace of FIG. 4 shows that after clearing operations have been performed during system startup, the clear signal CLR on line 36 is constant at 0 volts.

As shown in the third trace of FIG. 4, the address line ADD is asserted at time $t_1$ and is deasserted at time $t_2$.

The fourth trace of FIG. 4 shows that the value of DATA_IN on line 26 is a constant low signal during data loading operations.

The signal N1 in the fifth trace of FIG. 4 represents the voltage at node N1 in FIG. 3.

The signal DATA_OUT in the sixth trace of FIG. 4 is the same as the voltage at node N2 and represents the contents of the memory element 24. When the memory element is storing a logic one, node N2 is high and DATA_OUT is high. When the memory element is storing a logic zero, node N2 is low and DATA_OUT is low.

As shown in the FIG. 4, at times t before t1, ADD is low, so transistor 58 is off. The voltage at node N1 is high and the voltage at node N2 is low. The output DATA_OUT is low. In this situation, the data stored in the memory element is a logic zero, because the memory element is in its cleared state. At time t1, ADD goes high, which turns on transistor 58 and connects the DATA_IN line, which is at 0 volts, to node N1, taking N1 low. The low voltage on node N1 is inverted by inverter 46, so that the voltage on node N2 goes high. The sixth trace of FIG. 4 shows that this makes DATA_OUT go high at t1. At this stage, a logic one is stored in the memory element 24. When the address line ADD is deasserted at time t2, transistor 58 is turned off, which isolates the memory element and prevents further state changes. The DATA_OUT signal remains high at time t2, as shown in the sixth trace of FIG. 4.

The traces of FIG. 5 illustrate the process of loading a logic "0" into a memory element 24 (FIG. 3) that has been cleared. In this situation, the memory element contains a logic zero, so the loading process does not change its state.

The first trace of FIG. 5 shows that the voltage Vcc applied to Vcc line 40 (FIG. 3) is constant at 1.2 volts. The positive power supply voltage Vcc is applied to inverters 46 and 52.

After clearing operations have been performed during system startup, the clear signal CLR on line 36 is constant at 0 volts, as shown by the second trace of FIG. 5.

As shown in the third trace of FIG. 5, the address line ADD is asserted at time $t_1$ and is deasserted at time $t_2$.

The fourth trace of FIG. 5 shows that the value of DATA_IN on line 26 is a constant high value during data loading operations. In the scenario of FIG. 5, a logic zero is being loaded into the memory element 24, so DATA_IN is high—i.e., the inverse of the desired cell contents. In the scenario of FIG. 4, a logic one was being loaded into the memory element 24, so DATA_IN was low.

The signal N1 in the fifth trace of FIG. 5 represents the voltage at node N1 in FIG. 3. N1 does not change when a zero is being loaded into a memory element that has already been cleared.

The signal DATA_OUT in the sixth trace of FIG. 5, which is the same as the voltage at node N2, represents the contents of the memory element 24. Because the memory element 24 is cleared, DATA_OUT is low prior to time $t_1$. After time $t_1$, ADD is asserted, which turns transistor 58 on and connects the high DATA_IN signal to node N1. N1 is already high, so applying the high DATA_IN signal to node N1 does not cause the state of the memory element 24 to change at time $t_1$, as shown in the DATA_OUT trace of FIG. 5. The DATA_OUT signal also remains fixed at its low value after the ADD line is deasserted at time $t_2$.

Figure 6:
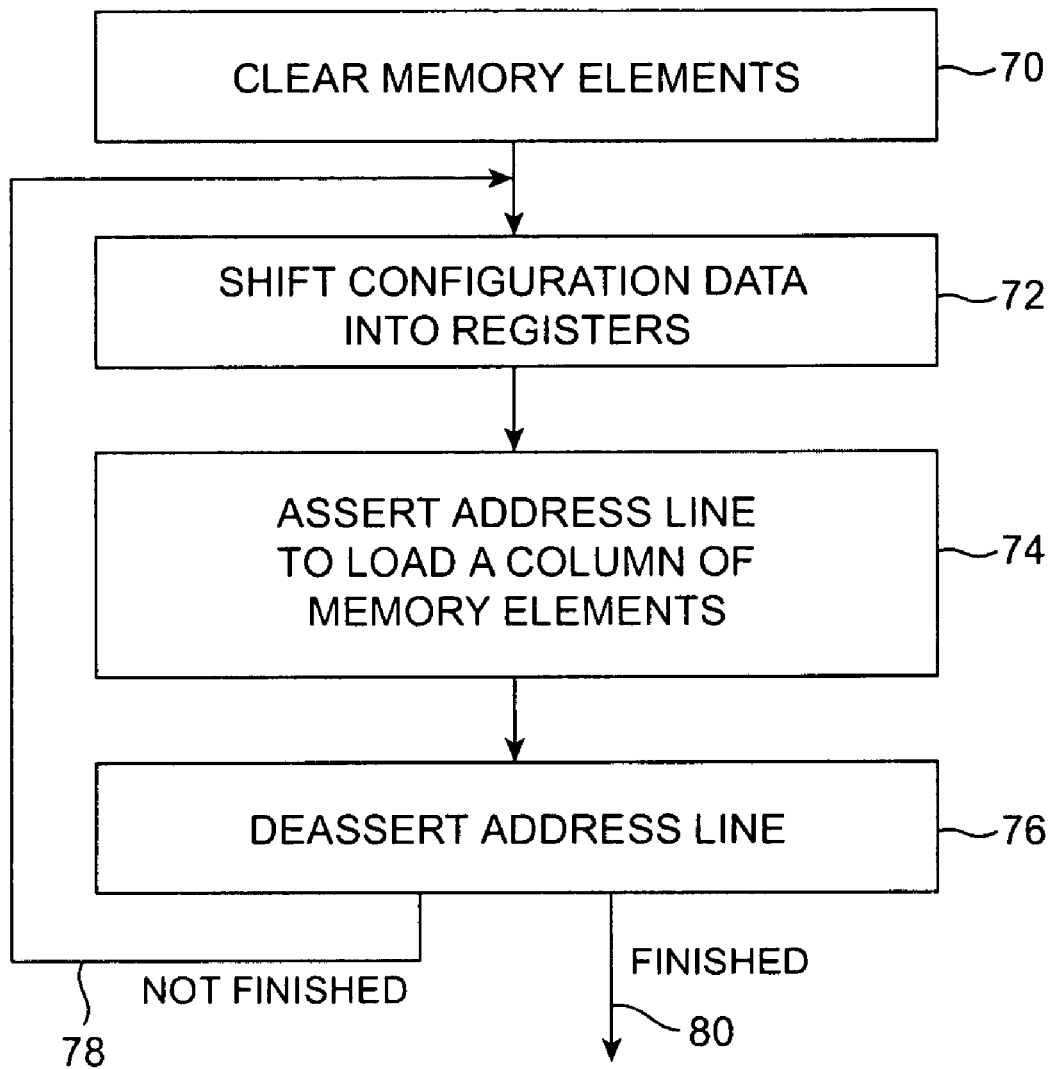
FIG. 6 is a flow chart of the steps involved in writing configuration data bits into a conventional programmable logic device memory element array of the type shown in FIG. 3.

A flow chart of the steps involved in clearing and programming conventional memory elements of the type shown in FIG. 3 are shown in FIG. 6.

At step 70, the memory elements are cleared using the clear line 36.

At step 72, configuration data is shifted into registers 30 via input 32 (FIG. 2).

At step 74, control signals are applied to address decoder 34 of FIG. 2 at input 44. The control signals direct the address decoder 34 to assert a desired address line 28 to address a column of memory elements in array 22. As shown in FIG. 3 and described in connection with FIGS. 4 and 5, asserting the address line loads the data that is present (in inverted form) on each DATA_IN line 26 into its associated memory element 24 in the addressed column.

At step 76, the address line is deasserted. If additional memory elements are to be loaded, processing returns to step 72 (line 78), otherwise processing is completed (line 80).

Proper operation of the memory element circuit of FIG. 3 requires that transistor 58 be sufficiently strong to overcome the voltage being driven onto node N1 at the output of inverter 52 by transistor 54 and that transistor 60 be sufficiently strong to overcome the voltage being driven onto node N2 by transistor 48 in inverter 46. If transistor 60 is too weak, it will not be possible to clear the memory element 24. If transistor 58 is too weak, it will not be possible to load a logic one into memory element 24. Moreover, it is necessary to produce a signal DATA_OUT that is strong enough to control transistor 64 properly.

As the semiconductor industry pushes for low values of Vcc, difficulties arise in using the circuit of FIG. 3. When a logic one is loaded into memory element 24, the DATA_OUT signal that is produced has a voltage of Vcc, as shown in the sixth trace of FIG. 4. At low values of Vcc, this DATA_OUT voltage will be relatively low. As a result, transistor 64 may not be driven with adequate strength. In this type of situation, logic signals that have voltages ranging between 0 volts and 1.2 volts (Vcc) at input 66 might degrade so much that they have voltages ranging from 0 volts and 0.6 volts on output 68. This level of signal degradation would be intolerable, because signals at 0.6 volts would not be recognized as valid logic high signals.

In accordance with the present invention, memory elements are powered at relatively lower power supply levels during loading operations and are powered at relatively higher power supply levels during normal operation. The relatively lower power supply levels that are used during loading avoid or reduce the need to rely on over-sized address and clear transistors. The relatively higher power supply levels that are used during normal operation ensure that the outputs of the memory elements will have sufficiently large voltages to serve as static control signals for pass transistors and other programmable logic circuitry.

Figure 7:
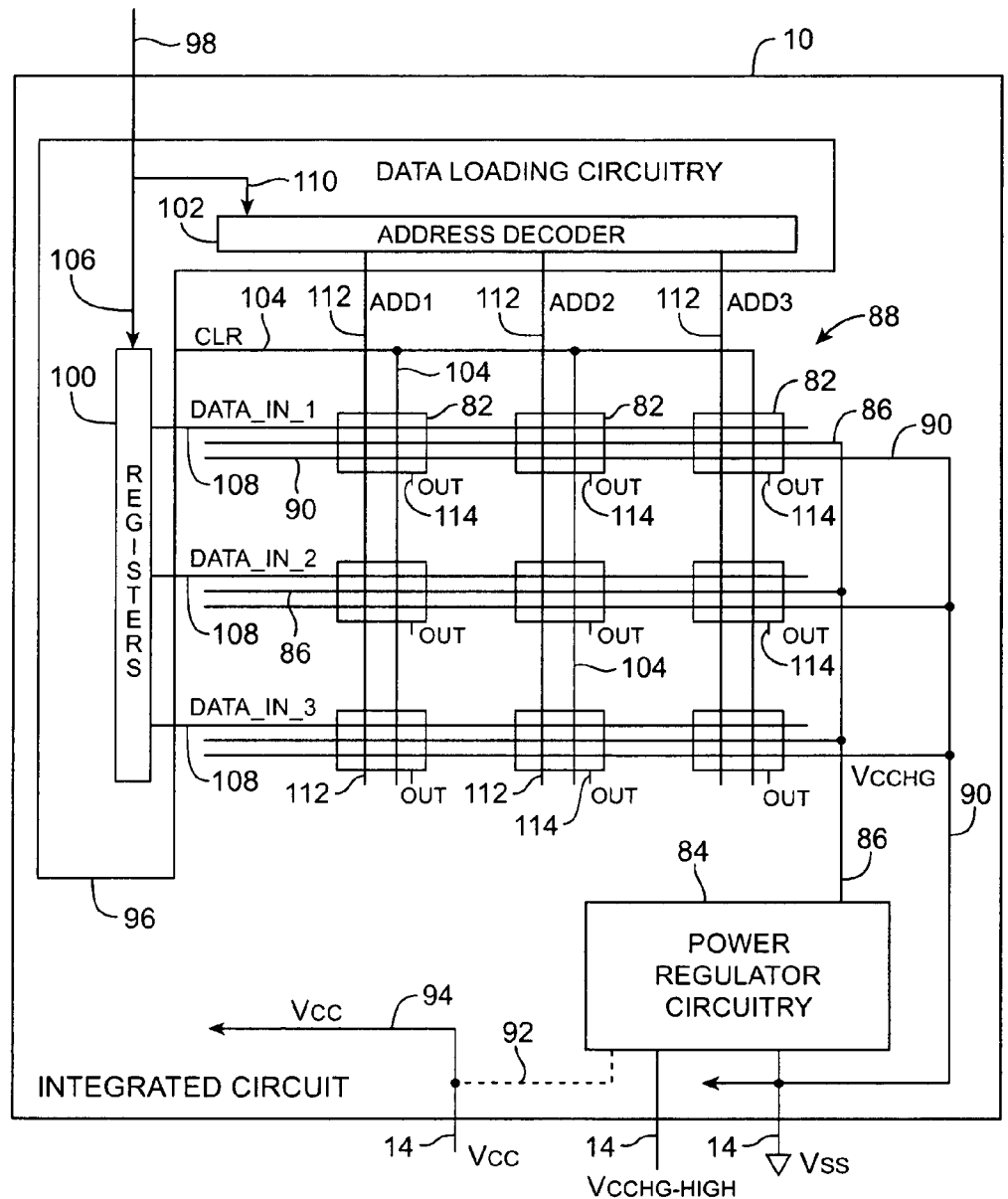
FIG. 7 is a diagram of an illustrative programmable logic device with memory element circuitry in accordance with the present invention.

An illustrative integrated circuit 10 such as a programmable logic device integrated circuit that contains memory elements 82 in accordance with the present invention is shown in FIG. 7. As shown in FIG. 7, integrated circuit 10 has power regulator circuitry 84. Power regulator circuitry 84 produces a time-varying positive power supply voltage Vcchg at power supply output line 86. The time-varying power supply voltage Vcchg varies from a high value of Vcchg-high to a low value of Vcchg-low.

The voltage Vcchg-low is used to power the memory elements 82 during programming. The voltage Vcchg-high is used to power the memory elements 82 during normal operation. Any suitable voltage levels may be used for Vcchg-high and Vcchg-low. For example, if an integrated circuit has core logic circuitry that is operating at a positive power supply voltage Vcc of 1.2 volts, then a voltage level of 1.6 volts might be used for Vcchg-high and a voltage level of 1.2 volts might be used for Vcchg-low. Other voltage levels could also be used. For example, Vcchg-low might be in the range of 0.8 volts to 1.2 volts or in the range of 0.6 volts to 1.2 volts while Vcchg-high is 1.6 volts or in the range of 1.4 to 1.7 volts. As another example, Vcchg-high may be elevated by using a voltage greater than 1.2 volts while Vcchg-low may be reduced by using a Vcchg-low value of less than or equal to 1.2 volts (e.g., 1.1 volts). The value of Vcc in these situations may be 1.2 volts or less. In general, any suitable voltage levels may be used, provided that Vcchg-high is greater than Vcchg-low. The use of a Vcchg-high level of 1.6 volts and a Vcchg-low value of 1.2 volts is merely illustrative.

Line 86 is used to distribute Vcchg to each of the memory elements 82 in memory element array 88. Ground line 90 distributes a ground power supply signal Vss (e.g., 0 volts) to the array 88. In the example of FIG. 7, there are three rows and three columns of memory elements 82 in array 88. This is merely illustrative. Integrated circuits such as integrated circuit 10 may have any suitable number of memory elements 82. A typical memory array might, as an example, have thousands or millions of memory elements 82 arranged in hundreds or thousands or rows and columns.

Power regulator circuitry 84 receives power through associated pins 14. Power regulator circuitry may generate the time-varying power supply signal Vcchg from the input power supply voltages applied with pins 14. For example, power supply regulator circuitry 84 may be powered at Vcchg-high and Vss and may produce a time-varying power supply voltage Vcchg by either passing Vcchg-high or a lowered value Vcchg-low to its output. The lowered value of Vcchg-low may be obtained from Vcchg-high using a voltage divider or other suitable voltage reduction circuitry. As shown by dotted line 92, power may optionally be provided to power regulator circuitry 84 at other voltages such as Vcc (e.g., 1.2 volts in this example). In this type of scenario, power supply regulator circuitry 84 may use a charge pump or other voltage-boosting circuitry to produce Vcchg-high. This internally-generated voltage level may then be used in supplying the time-varying power supply voltage Vcchg at the output of power regulator circuitry 84. In general, higher voltages such as Vcchg-high may be obtained from lower voltages such as Vcc using charge pump circuitry or other voltage boosting circuitry, whereas lower voltages such as Vcchg-low may be obtained from higher voltages such as Vcchg-high using voltage divider circuitry or other voltage reduction circuitry.

Line 94 is used to distribute the power supply voltage Vcc to other circuitry on integrated circuit 10. For example, programmable logic device integrated circuits such as programmable logic device integrated circuit 10 of FIG. 1 contain programmable logic 18 that may be powered at the power supply voltage Vcc.

Using a low value of Vcc (typically a voltage of 1.2 volts or less for modern integrated circuits) provides benefits such as reduced power consumption for the integrated circuit. The value of Vcchg is generally equal to or higher than Vcc during normal operation, but this higher voltage enhances the operation of pass transistors and other programmable logic 18 during operation of the device and need only be distributed to a subset of the circuitry on the device (i.e., memory array 88).

Data loading and control circuitry 96 controls clearing and data loading operations for array 88. Data loading and control circuitry 96 receives configuration data from external sources via input path 98. In a typical system, configuration data is loaded into a programmable logic device from a memory and data loading circuit. This type of circuit, which is sometimes referred to as a configuration device, loads configuration data into registers 100. Address decoder 102 may receive external control signals via path 98 or addressing control signals can be generated internally in data loading and control circuitry 96.

Data loading and control circuitry 96 produces clear signals on clear line 104 (labeled CLR). Asserting the signal CLR with circuitry 96 clears the contents of the memory array 88. Clearing operations are typically performed upon system power-up or during reconfiguration. After the array has been cleared, the CLR signal is deasserted and the configuration data is loaded.

Configuration data may be loaded into registers 100 in series via input 106. Registers 100 apply the configuration data in parallel to array 88 via the DATA_IN_1, DATA_IN_2, and DATA_IN_3 lines 108. Address decoder 102 receives addressing information via input 110 from an external source or from circuitry in data loading and control circuitry 96. The address decoder 102 systematically asserts desired address lines 112 (i.e., ADD1, ADD2, or ADD3). As the address line in each column is asserted, the data on the data lines 108 is loaded into the memory elements 82 in that column. By addressing each column in this way, the entire array 88 is loaded with configuration data. After the array has been loaded, the output 114 of each memory element 82 produces a corresponding static control signal for controlling the gate of a pass transistor or other logic component in the programmable logic 18 of the programmable logic device 10 (FIG. 1).

Figure 8:
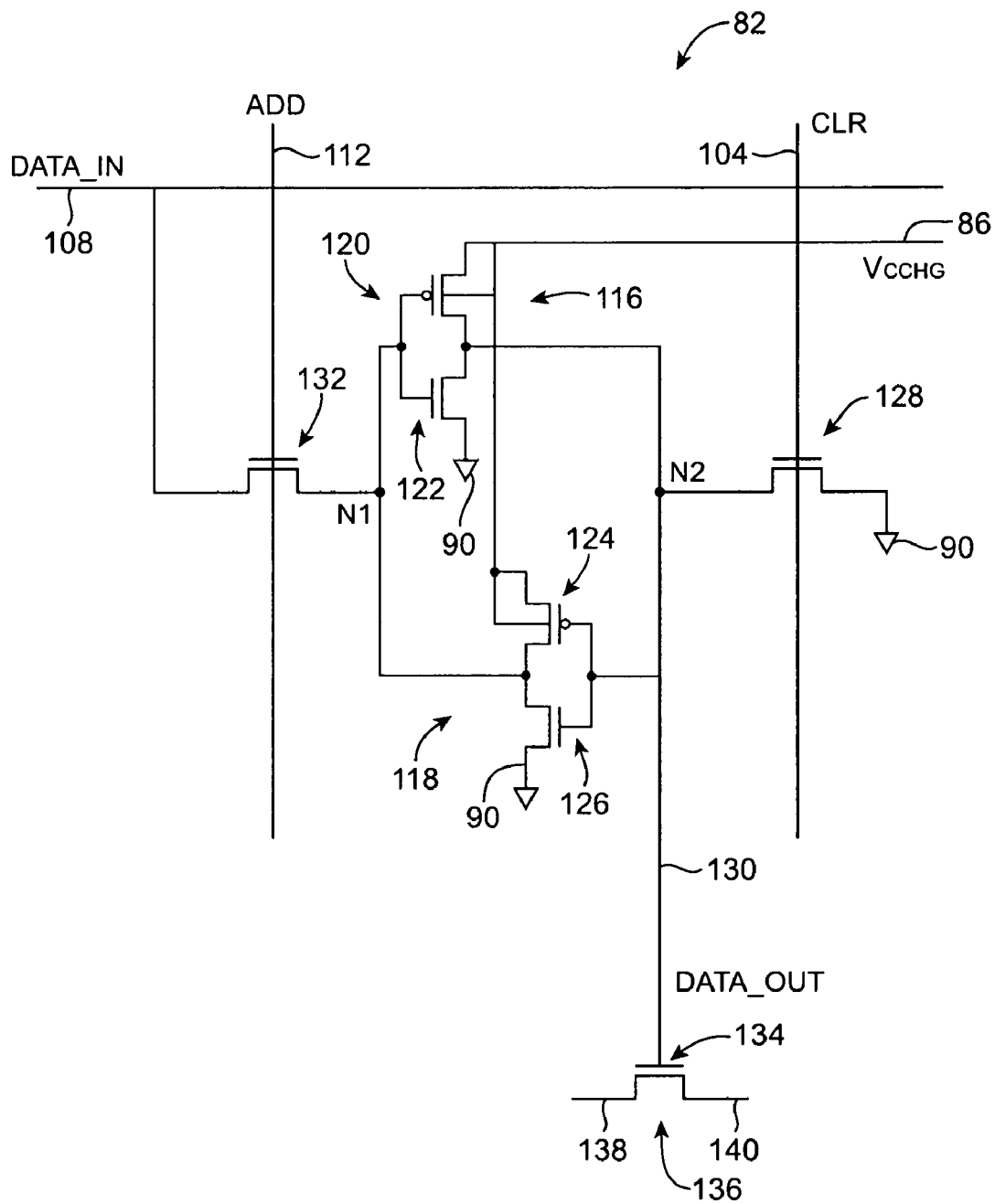
FIG. 8 is a diagram of an illustrative memory element for an integrated circuit such as a programmable logic device integrated circuit of the type shown in FIG. 7 in accordance with the present invention.

A memory element 82 of the type used in array 88 of FIG. 7 is shown in FIG. 8. Memory element 82 is formed from two cross-coupled inverters—inverter 116 and inverter 118. Inverter 116 has a p-channel metal-oxide-semiconductor (PMOS) transistor 120 and an n-channel metal-oxide-semiconductor (NMOS) transistor 122. Inverter 118 has PMOS transistor 124 and NMOS transistor 126.

The NMOS clear transistor 128 is turned on during clear operations by activating clear line 104. This connects node N2 to ground 90 and clears the memory element 82. The output of the memory element on line 130 (DATA_OUT) is determined by the signal on node N2.

When address line 112 (signal ADD) is taken high, NMOS address transistor 132 is turned on and the signal on data line 108 is driven into the memory element 82. If the memory element 82 is cleared and the signal on line 108 is high, node N1 remains high when ADD is asserted and the memory element 82 remains in its low (cleared) state. In this situation, the voltage on node N2 is low and the output DATA_OUT is low (i.e., Vss or 0 volts) on line 130. If the memory element 82 is cleared and the signal on line 108 is low when ADD is asserted, node N1 is taken low. Inverter 116 inverts the low voltage on node N1, so that the voltage on node N2 and the signal DATA_OUT on line 130 is taken high.

The DATA_OUT signal is applied to the gate 134 of pass transistor 136 (or other suitable logic component in programmable logic 18). When DATA_OUT is low, pass transistor 136 is off. When DATA_OUT is high, pass transistor 136 is on and data is allowed to flow between line 138 and line 140.

Positive power supply voltage Vcchg is applied to the inverters via line 86. Ground voltage Vss is applied via ground line 90. During data loading operations, the value of Vcchg is relatively low (i.e., Vcchg-low), which facilitates loading of memory element 82. During normal operation following programming, the value of Vcchg is elevated (i.e., Vcchg-high). The Vcchg-high voltage is used to power inverters 116 and 118. Accordingly, the magnitude of the output data from each element 82 is either 0 volts (when the memory element 82 is storing a low configuration data bit and DATA_OUT is low) or Vcchg-high (when the memory element 82 is storing a high configuration data bit and DATA_OUT is high). The value of Vcchg-high is preferably large enough so that a high DATA_OUT signal on line 130 satisfactorily turns on components such as pass transistor 136.

Figure 9:
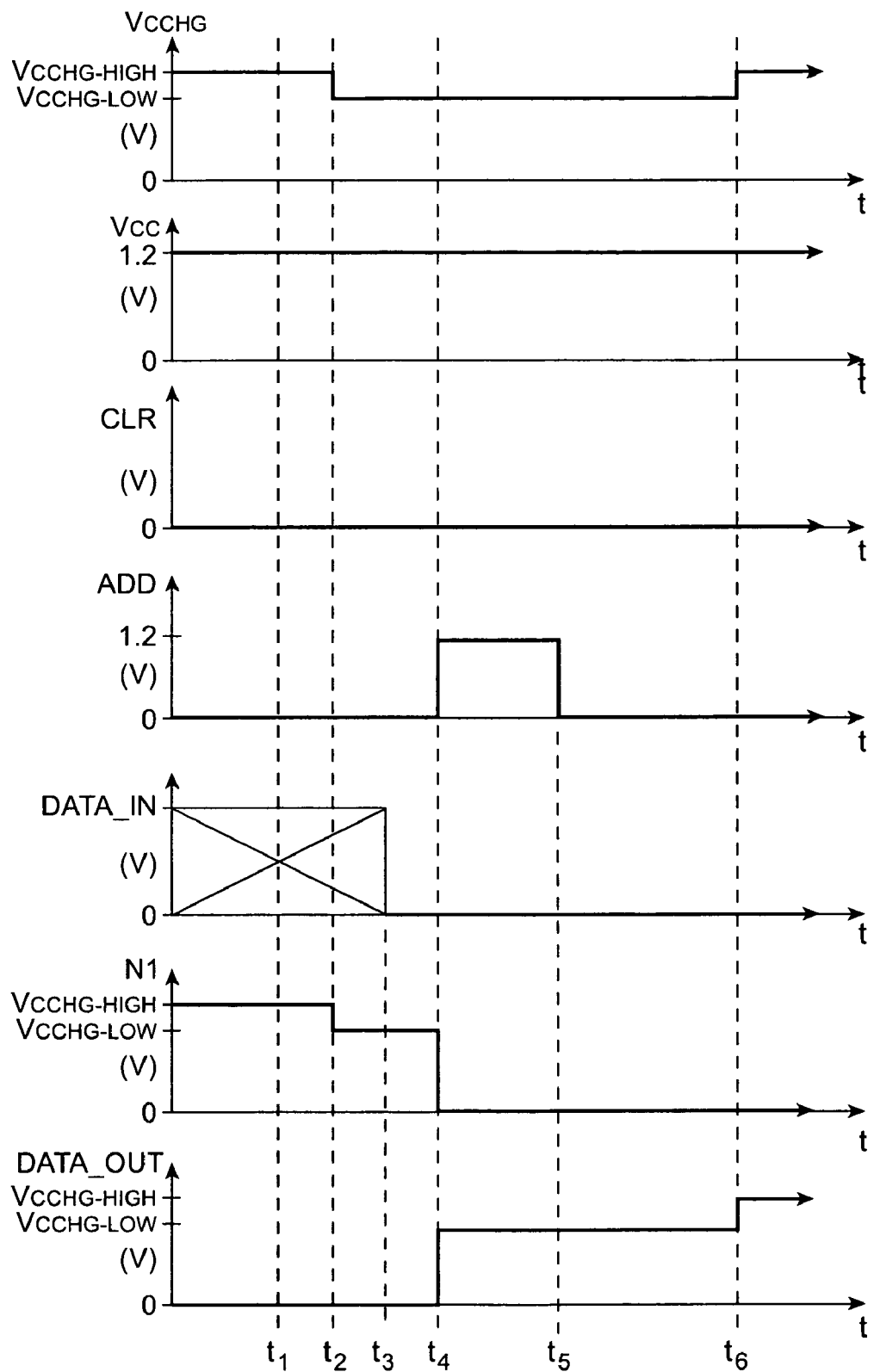
FIG. 9 is a timing diagram showing how a programmable logic device memory cell of the type shown in FIG. 8 is loaded with a configuration data bit having a logic one value in accordance with the present invention.
Figure 10:
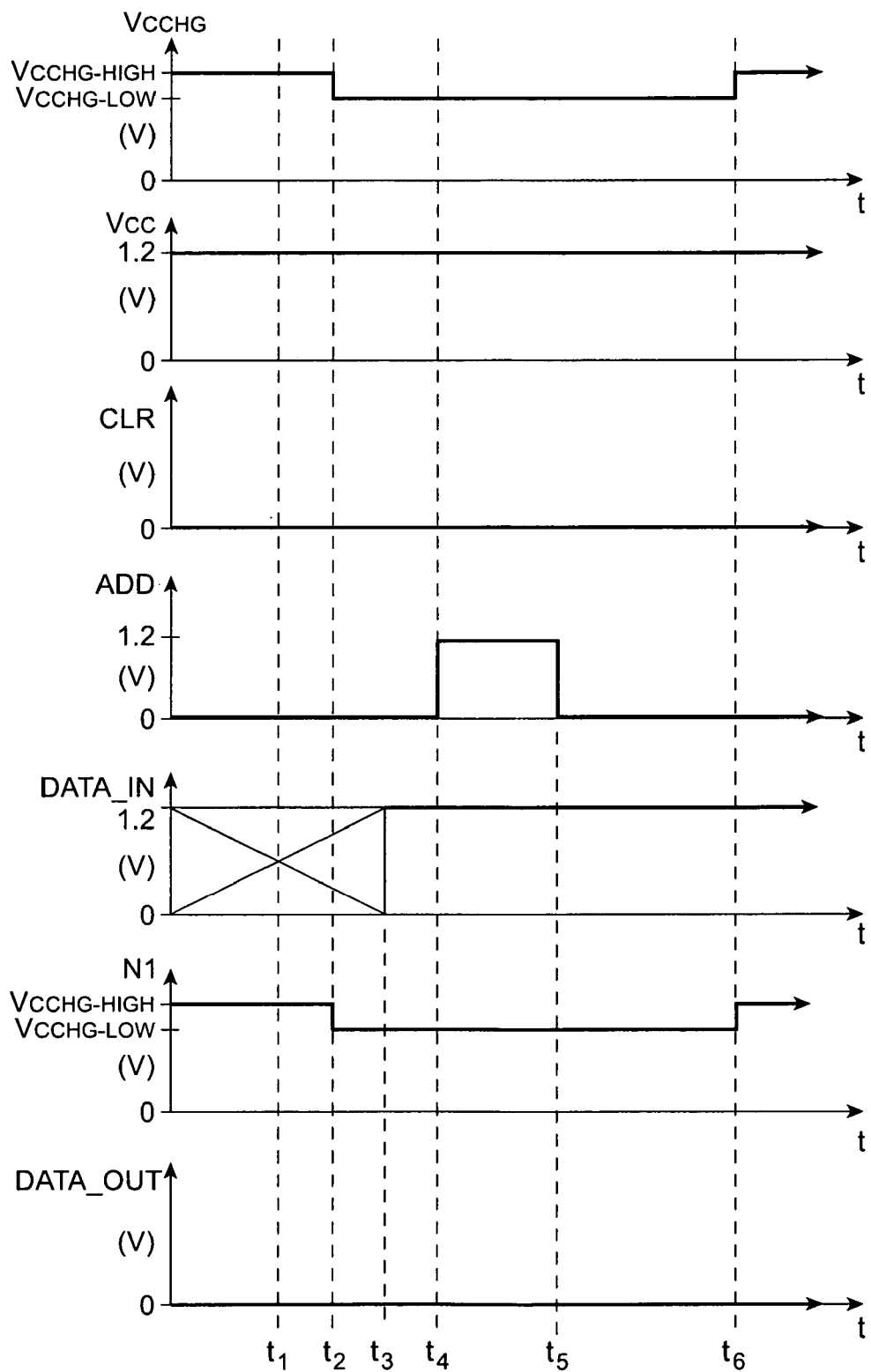
FIG. 10 is a timing diagram showing how a programmable logic device memory cell of the type shown in FIG. 8 is loaded with a configuration data bit having a logic zero value in accordance with the present invention.

Operations associated with loading the memory element 82 are shown in the timing diagrams of FIGS. 9 and 10. These operations typically take place after the memory array 88 has been cleared upon power-up. The traces of FIG. 9 illustrate the process of loading a logic 1 into a cleared memory element 82. The traces of FIG. 10 illustrate the process of loading a logic 0 into a cleared memory element 82.

The first trace of FIG. 9 shows that the power supply voltage Vcchg that is applied to line 86 by power regulator circuitry 84 (FIG. 7) to power the memory elements 82 in array 88 varies between an elevated value of Vcchg-high and a reduced value of Vcchg-low. The positive power supply voltage Vcchg is applied to inverters 116 and 118. In the example of FIG. 9, the value of Vcchg is initially high (at time $t_1$). When it is desired to load a configuration data bit into memory element 82, power regulator circuitry 84 reduces the value of Vcchg from Vcchg-high to Vcchg-low (time $t_2$). After all of the columns of array 88 have been loaded with configuration data, the power regulator circuitry 84 raises the value of Vcchg to Vcchg-high (at time $t_6$). At times after $t_6$, the integrated circuit 10 is operating normally and each memory element 82 is producing a static output signal at a value of Vss (when a logic 0 has been stored) or at Vcchg-high (when a logic 1 has been stored).

As shown in the second trace of FIG. 9, the value of Vcc in this example remains constant at 1.2 volts. The power supply voltage Vcc may, for example, be used to power circuitry such as programmable logic 18 (FIG. 1) and data loading and control circuitry 96 (FIG. 7). If desired, other power supply voltages may be used on programmable logic device 10. For example, a higher voltage Vccio may be used to power input-output circuitry 12 (FIG. 1).

As shown by the third trace of FIG. 9, after clearing operations have been performed during system startup, the clear signal CLR on line 104 is constant at 0 volts.

The fourth trace of FIG. 9 shows how the address line ADD is asserted at time $t_4$ and is deasserted at time $t_5$.

The fifth trace of FIG. 9 shows that the value of DATA_IN on line 108 is not defined at times t before $t_3$. At time $t_3$, data loading circuitry 96 produces a low DATA_IN signal (in the FIG. 9 example).

When the address line ADD is taken high at $t_4$, transistor 132 (FIG. 8) is turned on, which connects the low DATA_IN line 108 to node N1.

The voltage on node N1 is shown in the sixth trace of FIG. 9. At time $t_1$, inverters 116 and 118 are powered at Vcchg-high and the voltage on node N1 is Vcchg-high. At time $t_2$, the voltage Vcchg drops from Vcchg-high to Vcchg-low (trace 1). This drop in Vcchg is reflected in the voltage on node N1, which also drops from Vcchg-high to Vcchg-low. At time $t_4$, when transistor 132 is turned on by the ADD signal and the low DATA_IN line is connected to node N1, the voltage on node N1 is taken low.

The low voltage on node N1 is inverted by inverter 116, so that the voltage on node N2 and the output voltage on line 130 (DATA_OUT) go high at time $t_4$. This completes programming of a single column of memory elements, so ADD is deasserted at time $t_5$.

The level of Vcchg generally remains low as each column of memory elements is loaded. After all desired columns of memory elements 82 have been loaded with configuration data, the power regulator circuitry 84 raises Vcchg from Vcchg-low to Vcchg-high (time $t_6$). With the power supply voltage Vcchg-high applied to inverters 116 and 118, the DATA_OUT signal on line 130 is at a voltage level of Vcchg-high. The DATA_OUT signal is elevated (Vcchg-high is at 1.6 volts compared to 1.2 volts for Vcc and Vcchg-low in this example), so the static high output signals that are applied to components such as pass transistor 136 (FIG. 8) are sufficiently high to turn on these components. The lowered value of Vcchg-low that is used when the address signal ADD is asserted relaxes the requirements on the relative strengths of NMOS transistor 132 and PMOS transistor 124. If Vcchg had not been lowered, a larger NMOS transistor and larger accompanying signal lines would have been required to ensure that PMOS transistor 124 could be overcome and that the IR drops associated with the data loading operation would not be excessive. When Vcchg is lowered during data loading, the strength requirements and real estate requirements for NMOS transistor 132 are lowered.

The traces of FIG. 10 illustrate the process of loading a logic 0 into a memory element 82 (FIG. 8) that has been cleared. In this situation, the memory element 82 contains a logic zero, so the loading process does not change its state.

The first trace of FIG. 10 shows that the power supply voltage Vcchg that is applied to line 86 by power regulator circuitry 84 (FIG. 7) varies between an elevated value of Vcchg-high and a reduced value of Vcchg-low, as described in connection with FIG. 9. The value of Vcchg is high at time $t_1$. At time $t_2$, power regulator circuitry 84 reduces the value of Vcchg from Vcchg-high to Vcchg-low in preparation for configuration data loading. The time-varying power supply voltage Vcchg may remain low until array 88 (FIG. 7) has been completely loaded. After array 88 has been loaded with configuration data, the power regulator circuitry 84 raises the value of Vcchg to Vcchg-high (time $t_6$).

As shown in the second trace of FIG. 10, the value of Vcc remains constant at 1.2 volts (in this example).

As shown by the third trace of FIG. 10, after clearing operations have been performed during system startup, the clear signal CLR on line 104 is constant at 0 volts.

The fourth trace of FIG. 10 shows how the address line ADD is asserted at time $t_4$ and is deasserted at time $t_5$.

The fifth trace of FIG. 10 shows that the value of DATA_IN on line 108 is not defined at times t before $t_3$. At time $t_3$, data loading circuitry 96 produces a high DATA_IN signal.

When the address line ADD is asserted at time $t_4$, transistor 132 (FIG. 8) is turned on, which connects the high DATA_IN line 108 to node N1. The voltage on node N1 is shown in the sixth trace of FIG. 10. At time $t_3$, the memory element 32 is in its cleared state. In this state, the voltage on node N2 is at ground. The inverters 116 and 118 are powered at a voltage of Vcchg-low, so the inverted N2 voltage at node N1 is Vcchg-low. At time $t_4$, when the address line is asserted, transistor 132 is turned on and the high DATA_IN line is connected to node N1. Node N1 is already high, so as shown in the seventh trace of FIG. 10, the state of the data output line DATA_OUT remains low and does not change its state at time $t_4$.

Data loading of the logic 0 bit into the memory element 82 is completed by deasserting the address line ADD at time $t_5$. After all columns of array 88 have been loaded with configuration data in this way, the power regulator circuitry 84 raises Vcchg from Vcchg-low to Vcchg-high at time $t_6$.

Figure 11:
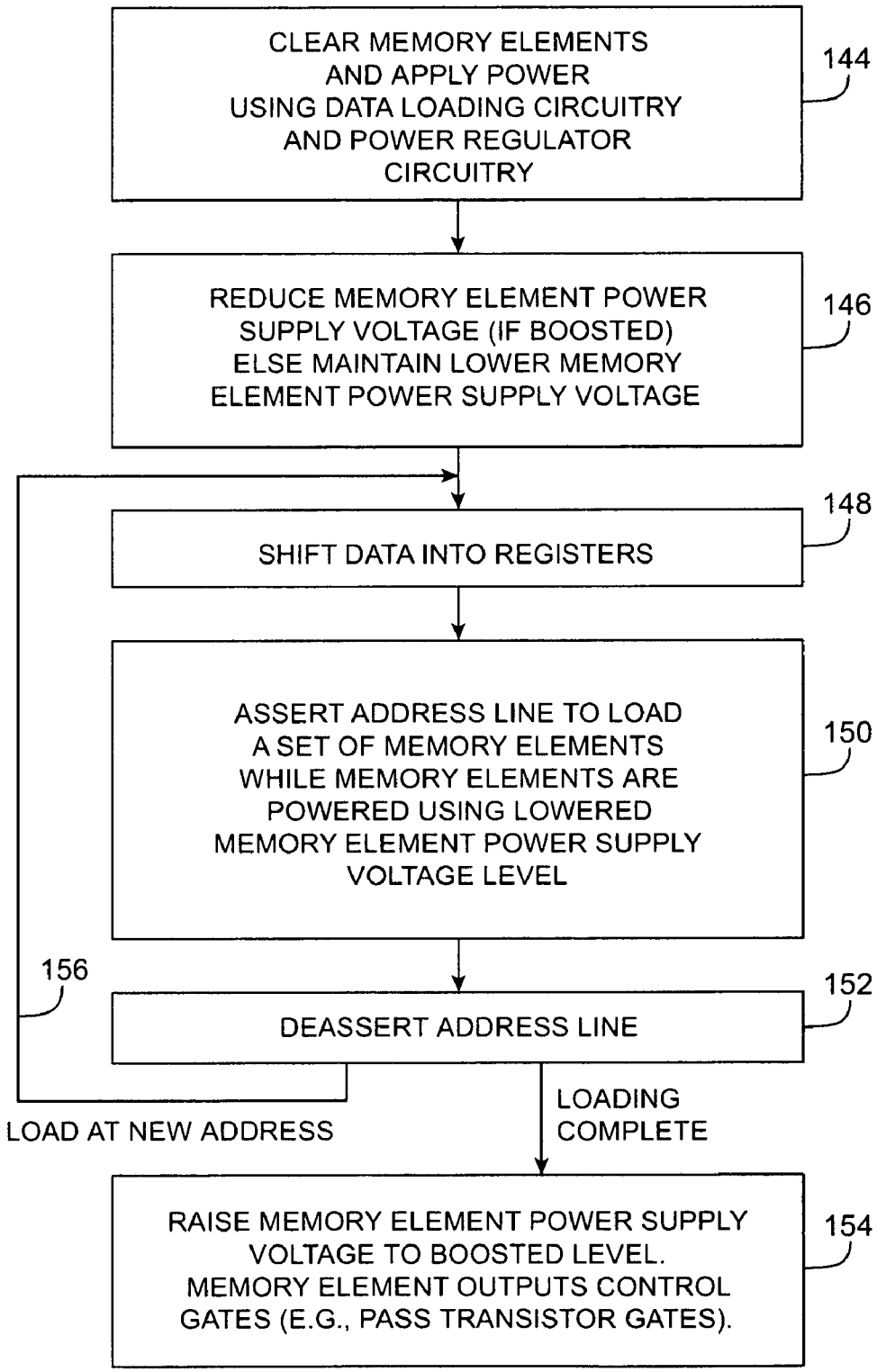
FIG. 11 is a flow chart of illustrative steps involved in writing configuration data bits into a programmable logic device memory element array of the type shown in FIG. 7 in accordance with the present invention.

A flow chart of illustrative steps involved in clearing and programming memory elements 82 of the type shown in FIG. 8 is shown in FIG. 11.

At step 144, the memory elements 82 are cleared using the clear line 104. During clearing operations, power may be supplied to the memory elements 82 at Vcchg-high, Vcchg-low, or another suitable power supply voltage.

At step 146, power regulator circuitry 84 reduces the power supply voltage Vcchg from its elevated (boosted) Vcchg-high level to Vcchg-low, as shown at time $t_2$ in the first traces of FIGS. 9 and 10. If Vcchg was already lowered in connection with loading a previous column of memory elements 82 or because power regulator circuitry 84 generated an initial power supply voltage of Vcchg-low upon power-up, Vcchg can be maintained at its lowered Vcchg-low value.

At step 148, configuration data is shifted into registers 100 in data loading circuitry 96 via path 98 and input 106 (FIG. 7).

At step 150, control signals are applied to address decoder 102 of FIG. 7 at input 110. The control signals direct the address decoder 102 to assert a desired address line 112 to address a column of memory elements in array 88. As shown in FIG. 8 and as described in connection with FIGS. 9 and 10, asserting the address line ADD loads the data that is present (in inverted form) on each DATA_IN line 108 into its associated memory element 82 in the addressed column. The operations performed during step 146 (lowering or maintaining Vcchg at the lower power supply voltage Vcchg-low) ensure that the strength of inverter 118 will be weak enough to allow configuration data to be loaded by address transistors such as address transistor 132 of FIG. 8 during step 150.

At step 152, the address line ADD is deasserted. If additional memory elements are to be loaded, processing returns to step 148 (line 156). The value of Vcchg preferably remains at Vcchg-low during each loop through steps 148, 150, and 152.

When all of the columns of array 88 have been loaded with data, the power regulator circuitry 84 raises the power supply voltage Vcchg to Vcchg-high (step 154), as shown at time $t_6$ in the first traces of FIGS. 9 and 10. At this stage, the memory elements and programmable logic device are operating normally. Memory elements containing logic 1 bits will produce output signals at Vcchg-high. Memory elements containing logic 0 bits will produce output signals at Vss.

By powering the inverters 116 and 118 of each memory element 82 with an elevated power supply voltage Vcchg-high during normal operation, the static output signals DATA_OUT provided by the memory elements containing logic 1 configuration data bits will be sufficiently strong to control programmable logic 18 (FIG. 1) such as pass transistor 134 of FIG. 8. Moreover, lowering Vcchg during configuration data loading operations ensures that each addressing transistor such as transistor 132 of FIG. 8 will be sufficiently strong to overcome the voltage being driven onto its associated node N1 in opposition to the output of inverter 118.

The foregoing is merely illustrative of the principles of this invention and various modifications can be made by those skilled in the art without departing from the scope and spirit of the invention.

What is claimed is:

1. An integrated circuit comprising:
   an array of memory elements powered with a time-varying power supply level;
   power regulator circuitry that varies the power supply level between a higher power supply level used during normal operation and a lower power supply level used during data loading operations; and
   data loading circuitry that loads data into the memory elements while the power supply level is at the lower power supply level, wherein while the power supply level is at the higher power supply level, at least some loaded memory elements provide output signals at the higher power supply level, wherein each memory element comprises two cross-coupled inverters, wherein each inverter comprises a p-channel metal-oxide-semiconductor transistor and an n-channel metal-oxide-semiconductor transistor, wherein the p-channel metal-oxide-semiconductor transistor and the n-channel metal-oxide-semiconductor transistor in each inverter are connected in series between a positive power supply terminal at which the time-varying power supply level is supplied from the power regulator circuitry and a ground terminal.

2. The integrated circuit defined in claim 1, further comprising programmable logic that is connected to the memory elements and that receives the output signals at the higher power supply level.

3. An integrated circuit comprising:
   an array of memory elements powered with a time-varying power supply level;
   power regulator circuitry that varies the power supply level between a higher power supply level used during normal operation and a lower power supply level used during data loading operations;
   data loading circuitry that loads data into the memory elements while the power supply level is at the lower power supply level, wherein while the power supply level is at the higher power supply level, at least some loaded memory elements provide output signals at the higher power supply level; and n-channel metal-oxide-semiconductor pass transistors having gates, wherein the output signals from at least some of the memory elements are provided to the gates.

4. An integrated circuit comprising:

an array of memory elements powered with a time-varying power supply level;

power regulator circuitry that varies the power supply level between a higher power supply level used during normal operation and a lower power supply level used during data loading operations; and data loading circuitry that loads data into the memory elements while the power supply level is at the lower power supply level, wherein while the power supply level is at the higher power supply level, at least some loaded memory elements provide output signals at the higher power supply level and wherein each memory element comprises an n-channel metal-oxide-semiconductor address transistor controlled by an address line.

5. integrated circuit comprising:

an array of memory elements powered with a time-varying power supply level;

power regulator circuitry that varies the power supply level between a higher power supply level used during normal operation and a lower power supply level used during data loading operations; and data loading circuitry that loads data into the memory elements while the power supply level is at the lower power supply level, wherein while the power supply level is at the higher power supply level, at least some loaded memory elements provide output signals at the higher power supply level and wherein each memory element comprises an n-channel metal-oxide-semiconductor clear transistor controlled by a clear line.

6. An integrated circuit comprising:

an array of memory elements powered with a time-varying power supply level;

power regulator circuitry that varies the power supply level between a higher power supply level used during normal operation and a lower power supply level used during data loading operations;

data loading circuitry that loads data into the memory elements while the power supply level is at the lower power supply level, wherein while the power supply level is at the higher power supply level, at least some loaded memory elements provide output signals at the higher power supply level; and programmable logic that is controlled by the output signals of the memory elements and that is powered at a positive power supply level that is smaller than the higher power supply level.

7. An integrated circuit comprising:

an array of memory elements powered with a time-varying power supply level;

power regulator circuitry that varies the power supply level between a higher power supply level used during normal operation and a lower power supply level used during data loading operations;

data loading circuitry that loads data into the memory elements while the power supply level is at the lower power supply level, wherein while the power supply level is at the higher power supply level, at least some loaded memory elements provide output signals at the higher power supply level and wherein the data comprises configuration data;

programmable logic that is controlled by the output signals of the memory elements and that is powered at a power supply level that is smaller than the higher power supply level; and registers in the data loading circuitry that receive the configuration data serially and that provide the configuration data to the memory elements in parallel.

8. A method for using memory elements on an integrated circuit comprising:

powering the memory elements on the integrated circuit with a first power supply level;

loading data into the memory elements while the memory elements are powered at the first power supply level; and powering the loaded memory elements with a second power supply level that is greater than the first power supply level, wherein at least some of the loaded memory elements that are powered with the second power supply level supply output signals at the second power supply level, wherein each memory element comprises two cross-coupled inverters each of which has a p-channel metal-oxide-semiconductor transistor and an n-channel metal-oxide-semiconductor transistor connected in series between a positive power supply terminal and a ground terminal and wherein powering the memory elements with the first power supply level comprises powering the memory elements with a first positive power supply voltage at the positive power supply terminal.

9. A method for using memory elements on an integrated circuit comprising:

powering the memory elements on the integrated circuit with a first power supply level;

loading data into the memory elements while the memory elements are powered at the first power supply level; and powering the loaded memory elements with a second power supply level that is greater than the first power supply level, wherein at least some of the loaded memory elements that are powered with the second power supply level supply output signals at the second power supply level, wherein each memory element comprises two cross-coupled inverters each of which has a p-channel metal-oxide-semiconductor transistor and an n-channel metal-oxide-semiconductor transistor connected in series between a positive power supply terminal and a ground terminal, wherein powering the memory elements with the first power supply level comprises applying a first positive power supply voltage to the positive power supply terminal, and wherein powering the loaded memory elements with the second power supply level comprises applying a second positive power supply voltage to the positive power supply terminal, wherein the second positive power supply voltage is greater than the first positive power supply voltage.

10. A method for using memory elements on an integrated circuit comprising:

powering the memory elements on the integrated circuit with a first power supply level;

loading data into the memory elements while the memory elements are powered at the first power supply level; and powering the loaded memory elements with a second power supply level that is greater than the first power supply level, wherein at least some of the loaded memory elements that are powered with the second power supply level supply output signals at the second power supply level, wherein each memory element comprises two cross-coupled inverters each of which has a p-channel metal-oxide-semiconductor transistor and an n-channel metal-oxide-semiconductor transistor connected in series between a positive power supply terminal and a ground terminal, wherein powering the memory elements with the first power supply level comprises applying a first positive power supply voltage to the positive power supply terminal, and wherein powering the loaded memory elements with the second power supply level comprises applying a second positive power supply voltage to the positive power supply terminal, wherein the first positive power supply voltage is less than or equal to 1.2 volts and the second positive power supply voltage is greater than 1.2 volts.

11. A method for using memory elements on an integrated circuit comprising:
    powering the memory elements on the integrated circuit with a first power supply level;
    loading data into the memory elements while the memory elements are powered at the first power supply level; and
    powering the loaded memory elements with a second power supply level that is greater than the first power supply level, wherein at least some of the loaded memory elements that are powered with the second power supply level supply output signals at the second power supply level, wherein:
    the integrated circuit is a programmable logic device integrated circuit; and
    loading data into the memory elements while the memory elements are powered at the first power supply level comprises loading programmable logic device configuration data into the memory elements while the memory elements are powered at the first power supply level.

12. A method for using memory elements on an integrated circuit comprising:
    powering the memory elements on the integrated circuit with a first power supply level;
    loading data into the memory elements while the memory elements are powered at the first power supply level; and
    powering the loaded memory elements with a second power supply level that is greater than the first power supply level, wherein at least some of the loaded memory elements that are powered with the second power supply level supply output signals at the second power supply level, wherein each memory element has an n-channel metal-oxide-semiconductor address transistor controlled by an address line, and the method further comprising:
    asserting and deasserting the address line to load the data when powering the memory elements with the first power supply level.

13. A method for using memory elements on an integrated circuit comprising:
    powering the memory elements on the integrated circuit with a first power supply level;
    loading data into the memory elements while the memory elements are powered at the first power supply level; and
    powering the loaded memory elements with a second power supply level that is greater than the first power supply level, wherein at least some of the loaded memory elements that are powered with the second power supply level supply output signals at the second power supply level, wherein each memory element has an n-channel clear transistor and an n-channel address transistor, the method further comprising:
    using the clear transistors to clear the memory elements before loading the data into the memory elements; and
    turning on the address transistor of each memory element while the memory element is powered at the first power supply voltage to load the data.

14. A method for using memory elements on an integrated circuit comprising:
    powering the memory elements on the integrated circuit with a first power supply level;
    loading data into the memory elements while the memory elements are powered at the first power supply level;
    powering the loaded memory elements with a second power supply level that is greater than the first power supply level, wherein at least some of the loaded memory elements that are powered with the second power supply level supply output signals at the second power supply level; and
    using the output signals of the memory elements to configure programmable logic on a programmable logic device integrated circuit.

15. A programmable logic device integrated circuit comprising:
    programmable logic powered at a first power supply level, wherein the programmable logic includes metal-oxide-semiconductor transistors having gates;
    memory elements that store configuration data and that produce corresponding output signals that are applied to the gates of the transistors to customize the programmable logic; and
    power regulator circuitry that applies a second power supply level to the memory elements when the memory elements are being loaded with the configuration data and that applies a third power supply level to the memory elements during normal operation of the programmable logic device integrated circuit, wherein when the configuration data stored in a given one of the memory elements is a logic one, the output signals produced by that memory element have a level equal to the third power supply level, wherein the second power supply level is less than the third power supply level, and wherein the first power supply level is less than the third power supply level.

16. The programmable logic device integrated circuit defined in claim 15 further comprising registers that supply the configuration data to the memory elements over data lines, wherein the first power supply level is less than or equal to 1.2 volts.

17. The programmable logic device integrated circuit defined in claim 15 further comprising registers that supply the configuration data to the memory elements over data lines, wherein the first power supply level is less than or equal to 1.2 volts and wherein the second power supply level is less than or equal to 1.2 volts.

18. The programmable logic device integrated circuit defined in claim 15 further comprising registers that supply the configuration data to the memory elements over data lines, wherein the first power supply level is less than or equal to 1.2 volts, wherein the second power supply level is less than or equal to 1.2 volts, and wherein the third power supply level is in the range of 1.4 to 1.7 volts.

19. An integrated circuit comprising:
    memory elements powered with a time-varying power supply level;
    power regulator circuitry that varies the power supply level between a higher power supply level and a lower power supply level; and
    data loading circuitry that loads data into the memory elements while the power supply level is at the lower power supply level, wherein each of the memory elements is comprised of cross-coupled inverters and each of the inverters is comprised of a p-channel metal-oxide-semiconductor transistor and an n-channel metal-oxide-semiconductor transistor connected in series between the time-varying power supply level and ground.

20. An integrated circuit comprising:
memory elements powered with a time-varying power supply level;
power regulator circuitry that varies the power supply level between a higher power supply level and a lower power supply level, wherein while the power supply level is at the higher power supply level, at least some memory elements provide output signals at the higher power supply level;
data loading circuitry that loads data into the memory elements while the power supply level is at the lower power supply level; and
n-channel metal-oxide-semiconductor pass transistors having gates, wherein output signals from the memory elements are provided to the gates.

21. An integrated circuit comprising:
memory elements powered with a time-varying power supply level;
power regulator circuitry that varies the power supply level between a higher power supply level and a lower power supply level, wherein while the power supply level is at the higher power supply level, at least some memory elements provide output signals at the higher power supply level;
data loading circuitry that loads data into the memory elements while the power supply level is at the lower power supply level; and
programmable circuitry that is controlled by the output signals and that is powered at a power supply level that is smaller than the higher power supply level.

22. The integrated circuit defined in claim 21 further comprising registers in the data loading circuitry that receive the data serially and that provide the data to the memory elements in parallel.

23. The integrated circuit defined in claim 21 wherein the power supply level is a positive power supply level.

24. The integrated circuit defined in claim 21, wherein the programmable circuitry comprises programmable logic.

25. The integrated circuit defined in claim 21, wherein the integrated circuit comprises a programmable logic device.

26. The integrated circuit defined in claim 21, wherein the memory elements comprise an array of memory elements.

27. The integrated circuit defined in claim 21 wherein the time-varying power supply level is at the higher power supply level during normal operation of the integrated circuit.

28. An integrated circuit comprising:
memory elements powered with a time-varying power supply level, wherein each of the memory element comprises an n-channel metal-oxide-semiconductor transistor controlled by a line;
power regulator circuitry that varies the power supply level between a higher power supply level and a lower power supply level; and
data loading circuitry that loads data into the memory elements while the power supply level is at the lower power supply level.

29. The integrated circuit defined in claim 28 wherein the n-channel metal-oxide-semiconductor transistor comprises an address transistor and the line comprises an address line.

30. The integrated circuit defined in claim 28 wherein the n-channel metal-oxide-semiconductor transistor comprises a clear transistor and the line comprises a clear line.

31. An integrated circuit comprising:
programmable circuitry powered at a first power supply level;
memory elements that produce output signals to customize the programmable circuitry; and
power regulator circuitry that applies a second power supply level to the memory elements during memory loading operations and that applies a third power supply level that is greater than the first and second power levels to the memory elements during other operations, wherein the output signals produced by memory elements that store a logic one have a level equal to the third power supply level.

32. The integrated circuit defined in claim 31 wherein the programmable circuitry includes metal-oxide-semiconductor transistors having gates and wherein the output signals are applied to the gates of the transistors.

33. The integrated circuit defined in claim 31 wherein the output signals correspond to data stored in the memory elements.

34. The integrated circuit defined in claim 33 further comprising registers that supply the data to the memory elements over data lines, wherein the first power supply level is less than or equal to 1.2 volts.

35. The integrated circuit defined in claim 33 further comprising registers that supply the data to the memory elements over data lines, wherein the first power supply level is less than or equal to 1.2 volts and wherein the second power supply level is less than or equal to 1.2 volts.

36. The integrated circuit defined in claim 33 further comprising registers that supply the data to the memory elements over data lines, wherein the first power supply level is less than or equal to 1.2 volts, wherein the second power supply level is less than or equal to 1.2 volts , and wherein the third power supply level is in the range of 1.4 to 1.7 volts.

37. The integrated circuit defined in claim 31, wherein the programmable circuitry comprises programmable logic.

38. The integrated circuit defined in claim 31, wherein the integrated circuit comprises a programmable logic device.

39. The integrated circuit defined in claim 31, further comprising programmable logic that is connected to the memory elements and that receives the output signals at the third power supply level.

* * * * *